United States Patent
Mock et al.

(10) Patent No.: US 7,116,100 B1
(45) Date of Patent: Oct. 3, 2006

(54) POSITION SENSING FOR MOVEABLE MECHANICAL SYSTEMS AND ASSOCIATED METHODS AND APPARATUS

(75) Inventors: M. Robert Mock, Moorpark, CA (US); Grant Sweer, Santa Clarita, CA (US)

(73) Assignee: HR Textron, Inc., Santa Clarita, CA (US)

( * ) Notice: Subject to any disclaimer, the term of this patent is extended or adjusted under 35 U.S.C. 154(b) by 0 days.

(21) Appl. No.: 11/084,969

(22) Filed: Mar. 21, 2005

(51) Int. Cl.
*G01B 7/30* (2006.01)
*G01B 7/14* (2006.01)

(52) U.S. Cl. .............................. 324/207.25; 324/207.2; 324/207.21

(58) Field of Classification Search ............. 324/207.2, 324/207.21, 207.25
See application file for complete search history.

(56) References Cited

U.S. PATENT DOCUMENTS

| | | | |
|---|---|---|---|
| 3,824,455 A | 7/1974 | Levitt et al. | 324/34 R |
| 5,585,719 A | 12/1996 | Endo et al. | 324/235 |
| 5,704,444 A | 1/1998 | Showalter | 180/247 |
| 2002/0093332 A1* | 7/2002 | Schroeder et al. | 324/251 |
| 2003/0169034 A1* | 9/2003 | Okumura | 324/207.21 |
| 2004/0085062 A1 | 5/2004 | Miyata et al. | 324/270.2 |
| 2004/0145364 A1* | 7/2004 | Onishi et al. | 324/207.2 |
| 2004/0189284 A1* | 9/2004 | Haubold et al. | 324/207.2 |
| 2005/0030011 A1* | 2/2005 | Shimizu et al. | 324/207.25 |

FOREIGN PATENT DOCUMENTS

| | | |
|---|---|---|
| DE | 195 43 562 A1 | 5/1996 |
| EP | 1 503 171 A2 | 2/2005 |
| WO | WO 2004/003478 A2 * | 1/2004 |

OTHER PUBLICATIONS

International Search Report for PCT/US2006/006877 mailed Jun. 22, 2006.

* cited by examiner

*Primary Examiner*—Bot LeDynh
(74) *Attorney, Agent, or Firm*—BainwoodHuang

(57) ABSTRACT

Position sensing of movable elements including but not limited to machine components is disclosed. Motion of a movable element can produce motion of a magnetic field, which can be detected by magnetic sensors. The motion and/or variations of a magnetic field and/or a magnetic flux may be produced by any combination of a motion of the sensors, associated magnets, or associated magnetic material. Magnetic sensors may be capable of measuring either rotary, or linear motion, or both. Such sensors can provide indication of an incremental position change, an absolute position, or both. Absolute position and high-resolution position sensing may be produced for measurement of either linear and/or angular motion. Suitable magnetic sensors include, but are not limited to, Hall effect devices and/or magneto-resistive elements, and may include multi-element magnetic sensors. Suitable signal conditioning and/or control means such as control electronics can be used to receive output signals from the sensors.

26 Claims, 11 Drawing Sheets

POSITION SENSING FOR MOVEABLE MECHANICAL SYSTEMS AND ASSOCIATED METHODS AND APPARATUS

BACKGROUND

Position sensors are commonly used to measure the position of various elements of a movable mechanical system. Such systems often include one or more actuators, which typically include a motor and output drive train, to provide the desired linear or rotary motion. These actuators are commonly electromagnetic, piezoelectric, pneumatic, and hydraulic actuators. These systems may also include position feedback sensors and circuitry as part of the associated actuator system, and may be referred to as servoactuators or servocontrol systems.

Position sensors for mechanical systems typically measure the displacement of an element of an actuator or a component moved by such an element. In some systems, magnetic sensors are used as to sense the position of the desired components. Two classes of such magnetic sensors are Hall effect sensors and magneto-resistive sensors. Hall effect sensors measure a voltage that is induced in a semiconductor material due to the effect of a magnetic field on an electrical current flowing in the semiconductor material, known as a Hall voltage. Hall effect sensors are sometimes referred to as Hall effect elements or Hall effect devices (HEDs). Magneto-resistive sensors utilize materials that exhibit a change in resistance due to the influence of a magnetic field.

One class of Hall effect sensors include digital Hall effect sensors, which typically provide a binary output that is dependent upon the presence, absence, and/or orientation of a magnetic field. The binary output, also known as the digital Hall state, can be counted and used to indicate the movement of the component of interest that the one or more magnets are coupled to. In this way, the movement and position of a servoactuator component of interest may be determined. Digital Hall effect devices typically include signal-conditioning circuitry, e.g., a Schmitt inverter, to condition the output signal of an analog HED.

Limitations exist with current techniques of sensing position with magnetic sensors. Such limitations may be particularly pronounced in movable mechanical systems having complex drive trains. Inaccurate position measurement can occur when individual magnetic sensors are subject to ambient environmental factors such a temperature variations, local magnetic field variations, and electromagnetic interference or noise. Calibration errors in the sensors may also produce or contribute to errors in position measurement.

Inaccurate position measurement can occur in movable mechanical systems, including those with complex drive trains, when one or more magnetic sensors are used to measure a single mechanical element that is subject to backlash or mechanical compliance. For example, backlash and mechanical compliance are not accommodated in a complex drive train by a magnetic sensor used to measure the rotation of an EMA motor shaft used as a prime mover for the drive train.

SUMMARY

The present invention addresses the previously described limitations. Aspects of the present invention may be used to detect motion of movable elements including but not limited to machine components of moveable mechanical systems. Motion of a movable element can produce motion and/or variation of a magnetic field of a magnet relative to a magnetic sensor. By sensing the motion of two or more moveable elements of a moveable mechanical system, the determination of position of associated mechanical components is improved. The motion and/or variations of a magnetic field and/or a magnetic flux may be produced by any combination of a motion of the sensors, associated magnets, or associated magnetic materials interposed between a sensor and an associated magnet. Certain aspects of the present invention are directed to multi-element magnetic sensors used for position sensing of movable elements, including but not limited to machine components. Multi-element sensors according to the invention may be capable of measuring either rotary or linear motion or both. The multi-element sensor can provide indication of an incremental position change, an absolute position, or both. Certain aspects of the present invention provide for a combination of absolute position sensing high-resolution position sensing for measurement of either linear and/or angular position. By combining two or more magnetic sensors in a moveable machine assembly, e.g., an actuator, redundant position measurement functionality can be provided or combined at different levels of mechanical advantage in the assembly to provide a broader range of position measurement, or higher measurement resolution, or both. Suitable magnetic sensors include, but are not limited to, Hall effect devices and/or magneto-resistive elements. Suitable signal conditioning and/or control means such as control electronics can be used to receive output signals from the sensors. The motion of movable elements, such as mechanical systems including actuators, can accordingly be measured and controlled. Position signals can be used in certain embodiments for desired control functions. For non-limiting example, position signals obtained from one or more multi-element magnetic sensors can be used to control the commutation of brushless DC motors, e.g., a motor of an EMA coupled to a drive train.

During position sensing operation, one or more multi-element magnetic sensors may provide electric signals to an electronic control unit, which can enable the electronic control unit to control a commutation sequence for a desired brushless DC motor, e.g., an EMA motor. For such a commutation sequence, the electronic control unit may use one or more position signals, each from a different multi-element magnetic sensor, to control output currents to stator coils within the DC motor of interest. By switching the currents to the stator coils in a commutation sequence, the currents in the stator coils generate magnetic fields that produce torque on a shaft of the rotor associated with the stator, causing the rotor and shaft to rotate to a desired position relative to the stator.

One embodiment of the present invention includes a position sensing system for a drive train having a plurality of moveable drive elements. The system includes a plurality of magnets each of which corresponds or is affixed to one of the plurality of drive elements. The system includes a plurality of magnetic sensors each of which are configured and operable to detect a change in flux density produced by motion of a magnetic field produced by a corresponding one of the plurality of magnets. Each magnetic sensor is operable to produce an output signal corresponding to the motion of the corresponding moveable drive element. Control means are operable to receive the output signals from the plurality of magnetic sensors and combine the output signals. The plurality of magnets may include multiple-poled magnets, such as eight-poled magnets. The magnetic sensors may include a multi-element magnetic sensor. The system electronic control means may be operable to produce a control signal as an output. The multi-element magnetic sensor may include a plurality of magneto-resistive elements. The plurality of magneto-resistive elements may include four magneto-resistive elements configured electrically in a bridge configuration. The bridge configuration may be a Wheatstone bridge. The multi-element magnetic sensor may include a plurality of Hall effect elements. The plurality of Hall effect elements may include proportional Hall effect elements. The plurality of Hall effect elements may include digital Hall effect elements. The plurality of Hall effect elements may include four proportional Hall effect elements configured and arranged in an IC.

The system may include a high-resolution magnetic sensor and a plurality of high-resolution magnets having alternating north and south magnetic poles arranged in a desired configuration, and the plurality of magnets may be affixed to one of the plurality of movable drive elements. The high-resolution magnetic sensor may be operable to measure magnetic field variations produced by the plurality of high-resolution magnets during motion of the movable element. The system may include a toothed magnetic flux guide adjacent to the high-resolution magnetic sensor and operable to channel magnetic flux from the plurality of high-resolution magnets to the high-resolution magnetic sensor. The high-resolution magnetic sensor may include a magneto-resistive element. The high-resolution magnetic sensor may include an analog Hall effect element. The high-resolution magnetic sensor may include a digital Hall effect element. The desired configuration may be a ring. The desired configuration may be a linear array. The system may include a flux guide affixed to the moveable element and operable to modulate magnetic flux at the magnetic sensor. The plurality of drive train elements may include a rotatable shaft, and one or more of the plurality of magnetic sensors may include a magnetic quadrature sensor. The magnetic quadrature sensor may include two pairs of magnetic yokes adapted to the circumference of the shaft. The shaft may include a plurality of magnets. A respective magnetic sensor may be disposed between ends of a respective pair of the two pairs of magnetic yokes, and the magnetic quadrature sensor may be operable to detect motion of the shaft and to produce as an output a quadrature signal corresponding to the motion. The control means may include an electronic control unit operable to receive the quadrature signal from the magnetic quadrature sensor and to provide sine wave quadrature decoding for the quadrature signal to determine a position of the shaft. The magnetic yokes may include a paramagnetic magnetic material. The magnets may include a magnetic material selected from the group consisting of iron, nickel, cobalt, dysprosium, and gadolinium.

A further embodiment includes a method of measuring position of a movable element of a drive train having a plurality of movable elements. The method may include producing motion of a movable element of the plurality of movable elements. Motion of a first magnetic field relative to a first magnetic sensor may be produced by the motion of the moveable element. Motion of a second magnetic field relative to a second magnetic sensor may be produced by the motion of the moveable element. Variations in the magnetic fields may be detected. An output signal corresponding to the variations in the magnetic fields may be produced, and a position of the moveable element may be measured. The step of producing motion of a movable element may include a step of moving an actuator output element. The step of producing motion of a magnetic field may include a step of moving a magnet affixed to the movable element. The step of producing motion of a magnetic field may include a step of moving the first magnetic sensor. The motion of the magnetic field may correspond directly to the motion of said movable element, in which case the output signal corresponds to an absolute position of the movable element. The motion of the magnetic field may be proportional to the motion of the movable element, in which case the output signal corresponds to a relative position of said movable element. The output signal can be used to control a commutation sequence of a brushless DC motor mechanically connected to the first movable element.

A further embodiment includes a gimbal that includes a plurality of rotatable frame elements rotatably coupled to one another by pivotable connections. Actuation means are coupled to rotatably connected pairs of the plurality of rotatable frame elements. The actuation means are operable to rotate each of the pairs of rotatable frame elements. The gimbal includes a plurality of first magnets, and each is affixed to a respective one of the plurality of rotatable frame elements. The gimbal includes a plurality of first magnetic sensors each of which are configured and operable to detect magnetic flux density of a magnetic field produced by a respective one of the plurality of first magnets, and further operable to produce an output signal corresponding to the detected magnetic flux. One or more second magnets are each affixed to a secondary drive element that is rotatably coupled to one of the plurality of rotatable frame elements. One or more second magnetic sensors are each configured and operable to detect magnetic flux density of a magnetic field produced by a respective one of the one or more second magnets, and further operable to produce an output signal corresponding to the detected magnetic flux. The gimbal includes electronic control means that are operable to receive the output signals from the plurality of first magnetic sensors and the one or more second magnetic sensors and to produce a compound resolution position signal.

The actuation means may include an EMA. The plurality of first magnetic sensors may include a multi-element magnetic sensor. The multi-element magnetic sensor may include a plurality of magneto-resistive elements. The plurality of magneto-resistive elements may include four magneto-resistive elements configured electrically in a bridge configuration. The bridge configuration is a Wheatstone bridge. The multi-element magnetic sensor may include a plurality of Hall effect elements. The plurality of Hall effect elements may include proportional or digital Hall effect elements. The plurality of Hall effect elements may include four proportional Hall effect elements configured and arranged in an IC. The gimbal may include a high-resolution magnetic sensor and a plurality of high-resolution magnets having alternating north and south magnetic poles arranged in a ring around the circumference of a motor shaft of the EMA. The high-resolution magnetic sensor may be operable to measure magnetic field variations produced by motion of the plurality of high-resolution magnet as the EMA motor shaft rotates.

DESCRIPTION OF DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

DETAILED DESCRIPTION

The present invention may be understood by the following detailed description, which should be read in conjunction with the attached drawings. The following detailed description of certain embodiments is by way of example only and is not meant to limit the scope of the present invention.

Aspects of the present invention may be used to detect motion of movable elements including but not limited to machine components. Embodiments of the present invention couple one or more magnets to a moveable element, which when moved can produce motion and/or variations of the magnetic field and/or a magnetic flux associated with the one or more magnets, which can be detected by magnetic sensors coupled thereto. The motion and/or variations of a magnetic field and/or a magnetic flux may be produced by any combination of a relative motion between the magnetic sensors, associated magnets, or by the motion of associated magnetic material disposed between a magnet and a corresponding magnetic sensor. Magnetic sensors according to the invention may be capable of measuring either rotary, or linear motion, or both. Such sensors can provide indication of an incremental position change, an absolute position, or both. Certain aspects of the present invention provide for a combination of absolute position sensing and high-resolution position sensing for measurement of either linear and/or angular position. By combining two or more magnetic sensors in a moveable machine assembly, e.g., an actuator, redundant position measurement functionality can be provided or combined at different levels of mechanical advantage in the assembly to provide a broader range of position measurement, or higher measurement resolution, or both. Suitable magnetic sensors include, but are not limited to, Hall effect devices and/or magneto-resistive elements.

Certain aspects of the present invention are directed to multi-element magnetic sensors used for position sensing of movable elements, including but not limited to machine components. Suitable signal conditioning and/or control means such as control electronics, or electronic controllers, can be used to receive output signals from the sensors. The motion of movable elements, such as mechanical systems including actuators, can accordingly be measured and controlled. Position signals can be used in certain embodiments for desired control functions. For non-limiting example, position signals obtained from one or more multi-element magnetic sensors can be used to control the commutation of brushless DC motors, e.g., a motor of an EMA coupled to a drive train.

Figure 1:
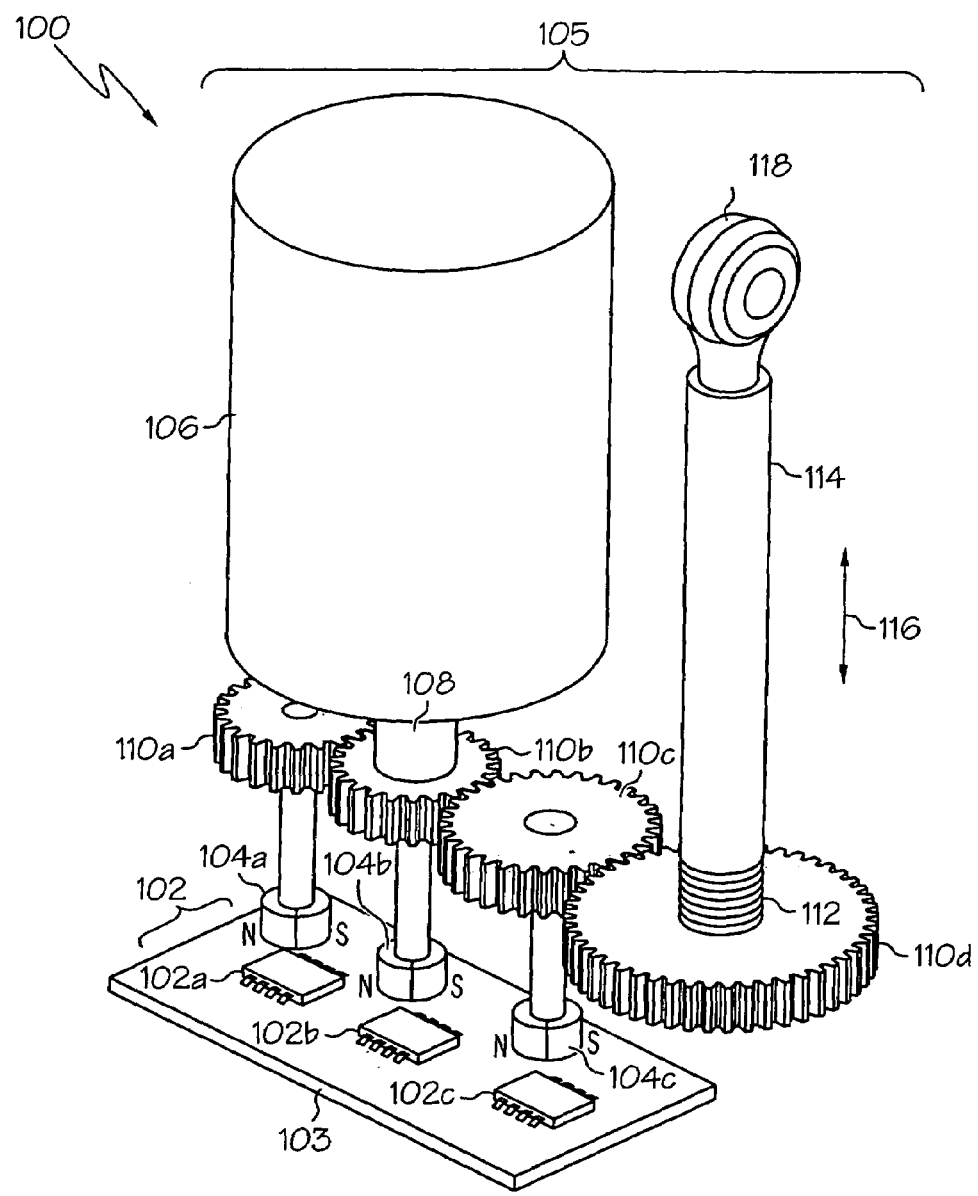
FIG. 1 depicts a perspective view of an embodiment of the invention that includes an EMA.

FIG. 1 depicts a perspective view of a preferred embodiment 100 that includes an electromagnetic actuator (EMA) 105. The EMA 105 includes a magnetic sensor assembly 102 that includes multi-element magnetic sensors 102a–102c that are configured and arranged to detect the motion of multiple magnets 104a–104c, respectively, that are affixed to moveable drive elements 110a–110c of the EMA 105. Suitable magnets 104a–104c include permanent multi-pole magnets and/or configurations of multiple magnets. Each of the magnetic sensors 102a–102c is configured to detect flux or variations in the magnetic field of a corresponding magnet 104a–104c. In certain embodiments, the sensors 102a–102c may be included in integrated circuits (ICs), which can be mounted on a printed circuit board (PCB) 103. Output signals from the magnetic sensors may be used for compound-resolution position sensing of the EMA elements as described in more detail below.

During position sensing operation, one or more multi-element magnetic sensors such as 102a–102c may provide electric signals to an electronic control unit (not shown), which can enable the electronic control unit to control a commutation sequence for a desired brushless DC motor, e.g., an EMA motor. For such a commutation sequence, the electronic control unit may use one or more position signals, each from a different multi-element magnetic sensor 102a–102c, to control output currents to stator coils within the DC motor of interest. By switching the currents to the stator coils in a commutation sequence, the currents in the stator coils generate magnetic fields that produce torque on a shaft of the rotor associated with the stator, causing the rotor and shaft to rotate to a desired position relative to the stator. In certain embodiments, the continuously received position signals from one or more multi-element magnetic sensors may be used by the electronic control unit for the commutation of a three-phase EMA motor.

The drive elements 110a–110d include primary drive elements 110b–d that receive power from a motor 106 by way of motor shaft 108, and also a secondary drive element 10a that does not transfer power to an output element. The primary drive elements 110b–d deliver power to a load output shaft 114 and output bearing 118 by way of a threaded connection 112 with primary drive element 110d. The output shaft 114 has a direction of motion indicated by arrow 116. The primary or secondary drive elements can be rotary elements, e.g. shafts, gears, screws or cranks, or linear elements, e.g. screws, links or racks. In certain applications, a drive element, such as a link, can both translate and rotate in its motion.

In operation of the EMA 105, each magnet 104a–104c moves with the respective drive train element 110a–110c to which it is affixed. Each magnetic sensor 102a–102c detects motion of the corresponding magnet 104a–104c, and therefore also detects motion of the drive element to which the respective magnet is attached. Electric signals produced by the magnetic sensors 102a–102c may be directed to and received by electronic control means, e.g., control electronics (not shown) for compound-resolution position measurement described in more detail below. By adjusting the size, e.g., radii, of drive elements 110–110c, the mechanical advantage of the drive elements can be changed. This can produce a corresponding adjustment to the output signals produced by the magnetic sensors 102a–102c, with a similar adjustment to the compound-resolution of position measurement.

In some embodiments, the relative positioning of the magnets 104a–104c and the magnetic sensors 102a–102c can be reversed, wherein the magnetic sensors rotate relative to the fixed magnets. Further, in certain embodiments, the magnets and magnetic sensors can remain stationary with respect to one another and the motion of the actuator can cause the motion of a magnetic material that is interposed between or placed near the magnets and sensor. Suitable magnetic material include paramagnetic and/or ferromagnetic materials, which are sometimes referred to as "soft" and "hard" magnetic materials, respectively.

Figure 2A:
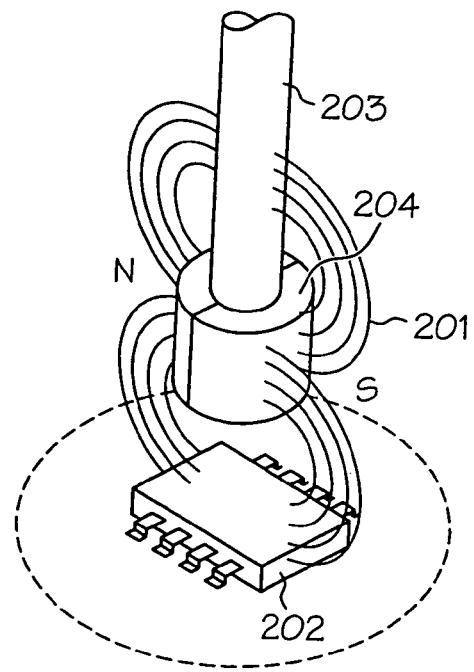
FIG. 2 includes FIGS. 2A–2B, which depict an embodiment of the present invention including a multi-element magnetic sensor that is configured to detect movement of a two-poled magnet.
Figure 2B:
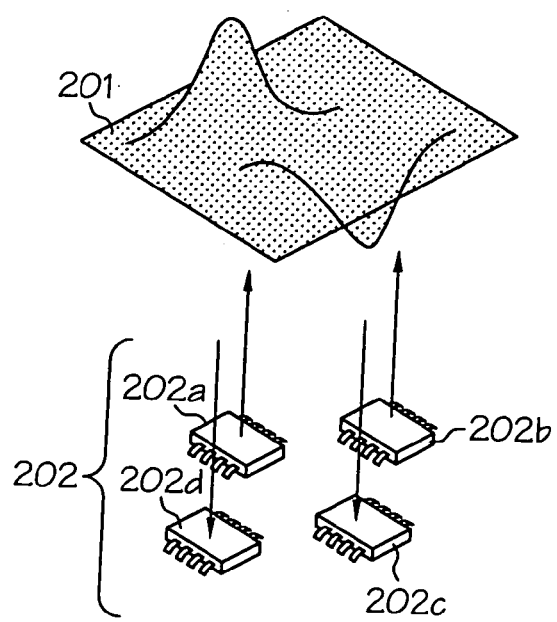

FIG. 2 includes FIGS. 2A–2B, which depict suitable sensors for position sensing according to an embodiment 200 of the present invention. A multi-element magnetic sensor 202 is configured and arranged to detect movement of a magnetic field 201 of a two-poled magnet 204 attached to a drive train element, e.g., rotatable shaft 203. The multi-element magnetic sensor 202 may include HEDs and/or magneto-resistive elements. The sensor 202 may be part of an integrated circuit (IC) and packaged in an IC assembly, which may also include suitable signal conditioning electronics. As illustrated in FIG. 2A, the multi-element magnetic sensor 202 is configured and arranged to detect flux density of the magnetic field 201 produced by the two-poled magnet 204. The magnet 204 may be mounted on an end of a rotatable shaft 203, e.g., one that is rotated by a machine element of an actuator. As the shaft 203 moves with respect to a multi-element magnetic sensor 202, so too does the magnetic field, depicted by magnetic flux 201, produced by the magnet 204. The different orientations of the magnetic field 201 are detected by the multi-element magnetic sensor 202. The absolute and/or relative position of the shaft 203 and/or mechanically connected components can be measured by suitable control means, such as control electronics (not shown), connected to the multi-element magnetic sensor 202. As depicted in FIG. 2b, multiple multi-element magnetic sensors 202a–202d may be used in concert to facilitate averaging of a temporally and/or spatially varying magnetic field, depicted by surface 201, in certain embodiments. In preferred embodiments, a rotary magnetic sensor, product number AS5040, available from Austria Micro Systems, is used for the magnetic sensor 202.

Figure 3:
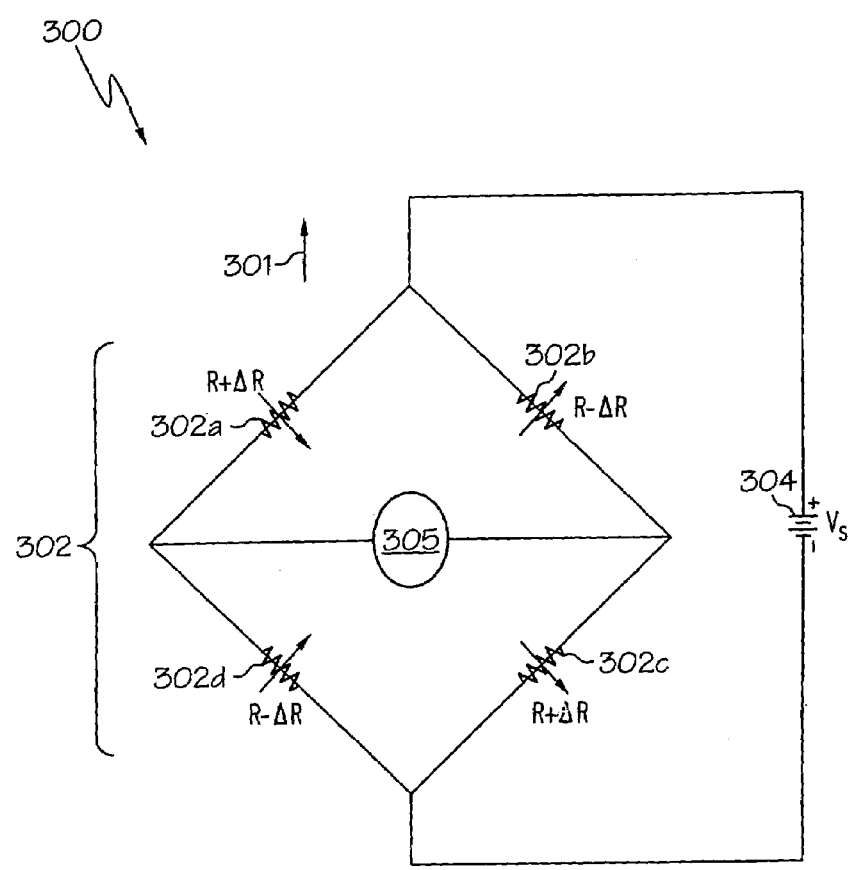
FIG. 3 depicts a multi-element magnetic sensor according to an embodiment of the present invention.

FIG. 3 depicts a multi-element magnetic sensor 302 for position sensing according to an alternate embodiment 300 of the present invention. The sensor 302 includes multiple proportional magneto-resistive magnetic sensors 302a–302d that are electrically connected to one another. The proportional magnetic sensors 302a–302d are configured and arranged in a bridge configuration to sense a variable magnetic flux density that is caused by a moving magnetic field 301. A voltage supply 304 supplies voltage to the proportional magnetic sensors 302a–302d. In certain applications, the proportional magnetic sensors 302a–320d may be arranged in a suitable Wheatstone bridge, as indicated.

By being in close proximity to one another and connected in a bridge configuration, such as a Wheatstone bridge, the proportional magnetic sensors 302a–302d can be self-calibrating and/or minimize the effects of measurement errors that are produced by a single sensor. For a bridge configuration in which each sensor has a resistance that is nominally equal, as indicated in FIG. 3 by R, environmental or mechanical factors may produce small variations in resistance among the sensors 302a–302d, as indicated by ΔR. Such variations in resistance ΔR may also be produced by local variations in the detected magnetic field 301. Resistance variations ΔR between different portions of the bridge configuration produce current at 305, which leads to an equalization, or averaging, of the resistance values of the magnetic sensors 302a–302d. As a result of this self-calibration capability, the proportional magnetic sensors 302a–302d can reduce or eliminate position measurement errors due to temperature variations, electromagnetic interference, minor misalignment or movement of an associated magnet, and/or variation in an applied voltage 304.

Figure 4:
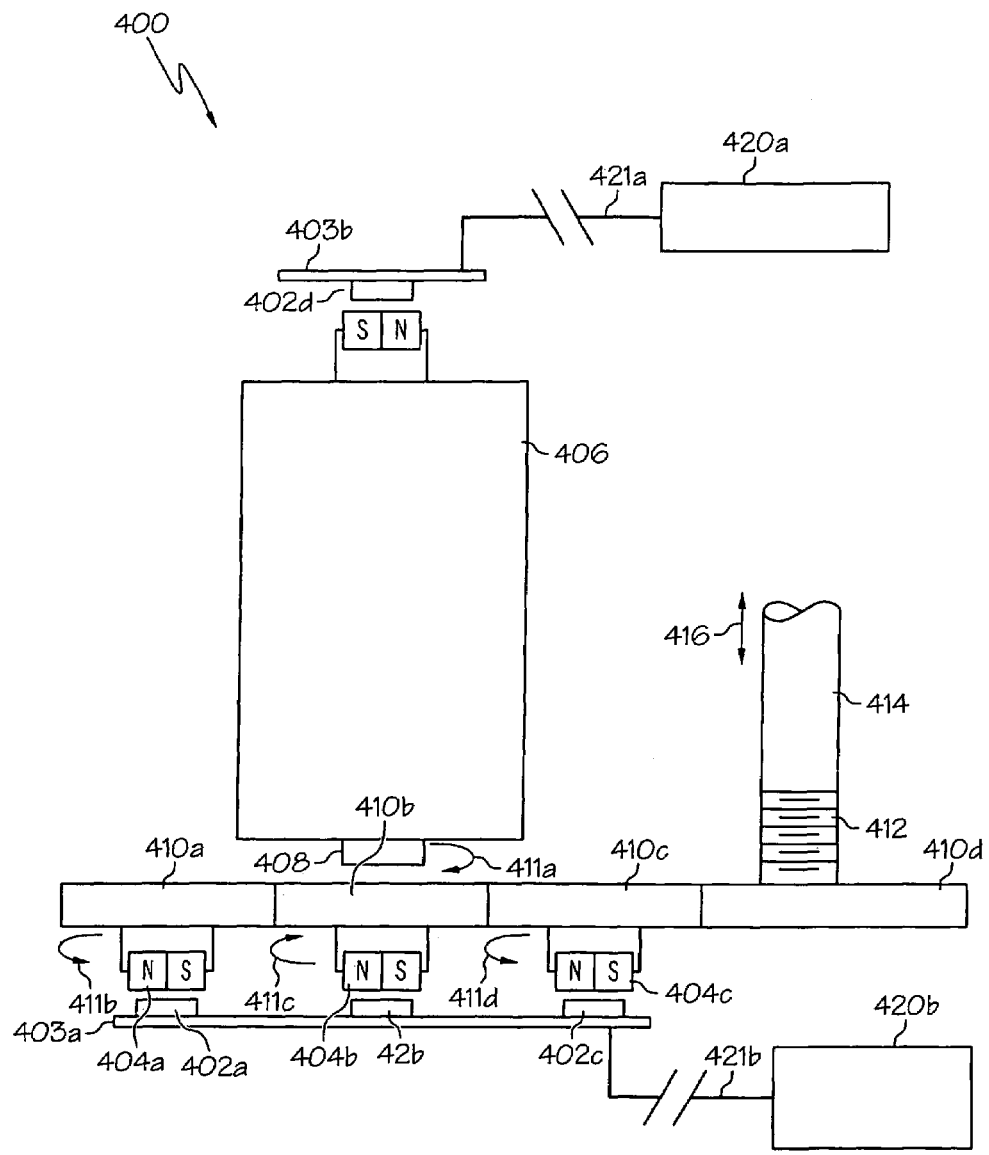
FIG. 4 depicts a side view of an embodiment that includes an EMA and electronic control means.

FIG. 4 depicts a side view of an embodiment 400, similar to that of FIG. 1, which includes an EMA 405 with magnets, sensors, and electronic control means, e.g., control electronics 420a–420b. The EMA 405 includes a motor 406 and motor shaft 408, which is operable to rotate a gear train that includes multiple gears 410a–410d. In operation, the gear train transfers power from the EMA motor 406 to an output shaft 414 by way of a power screw 412. For an assumed direction of rotation 411a, e.g., counter-clockwise, of the motor shaft, the corresponding directions of rotation of gears 410a–410c are indicated by arrows 411b–411d. It will of course be understood that the directions of rotation depicted will be reversed when the direction of rotation of the motor output shaft is reversed. The output shaft 414 has a direction of motion indicated by arrow 416.

The control electronics 420a–420b are connected to the multi-element magnetic sensors 402a–402c and 402d, respectively, by suitable connections, such as electrical connections 421a–421b, respectively. The control electronics 420a–420b may include desired logic, signal processing and/or signal conditioning circuitry. The control electronics 420a–420b process and apply the signal(s) received from the multi-element magnetic sensors 402a–402c and 402d, respectively, to provide useful monitoring and/or control functionality. For example, signals received from the multi-element magnetic sensors 402a–402c and 402d may be used by the control electronics 420a–420b, respectively, to determine and control the position of an output element (not shown) coupled to output shaft 414 of an associated EMA 405. The control electronics 420a–420b may report position of sensed mechanical components to local or higher-level electronics, for example, an alarm system or control computer. In some embodiments, the control electronics 420a–420b may be a single unit.

In certain situations, one or more magnetic sensors and the corresponding magnets may be positioned away from particular components of a movable mechanical assembly. For example, locating the magnetic sensors and the corresponding magnets apart from a motor of an EMA, may provide the ability to thermally isolate the sensors from heat produced by the EMA motor. Moreover, remote positioning of a sensor may be desirable to produce one or more position signals based on movement of a particular drive element that is spaced apart from the motor shaft or other drive elements. The ability for remote positioning of one or more magnetic sensors may allow sensors to be placed at a convenient or accessible locations to provide otherwise unavailable position measurement. Accuracy of position measurement by magnetic sensors may be improved, in certain embodiments, by measuring the motion of an output element of a mechanical system, thereby reducing the deleterious effects of mechanical backlash. In certain embodiments, such reduction of backlash effects can improve servo-control dynamics.

Figure 5A:
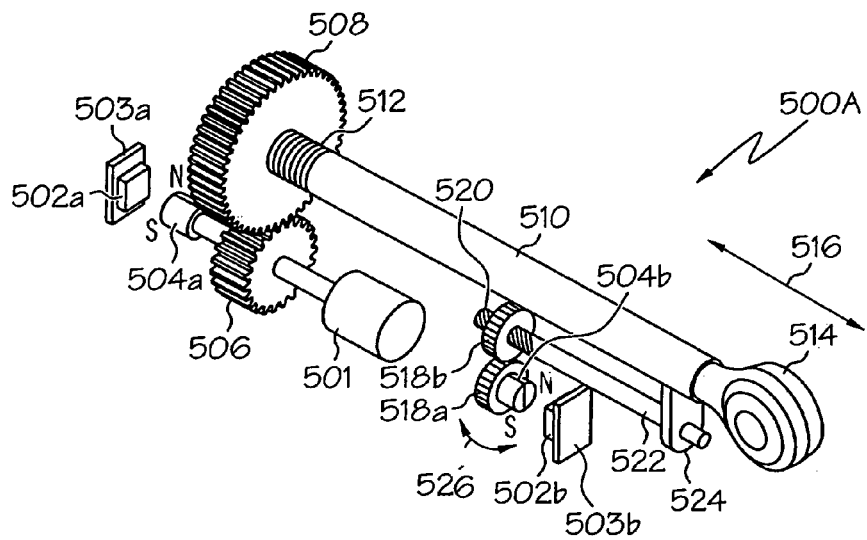
FIG. 5 includes FIGS. 5A–5C, which depict embodiments of multi-element magnetic sensor and magnet configurations according to the present invention.
Figure 5B:
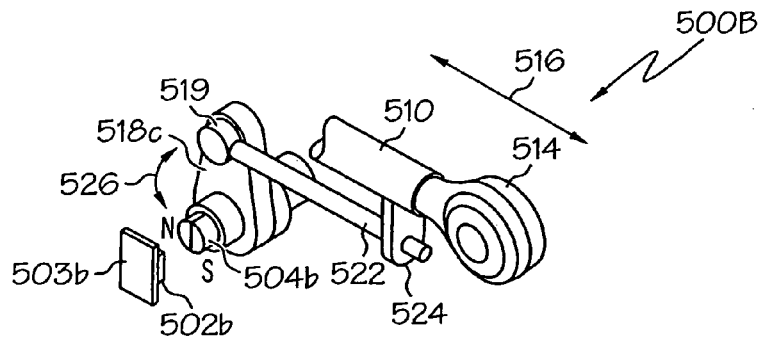
Figure 5C:
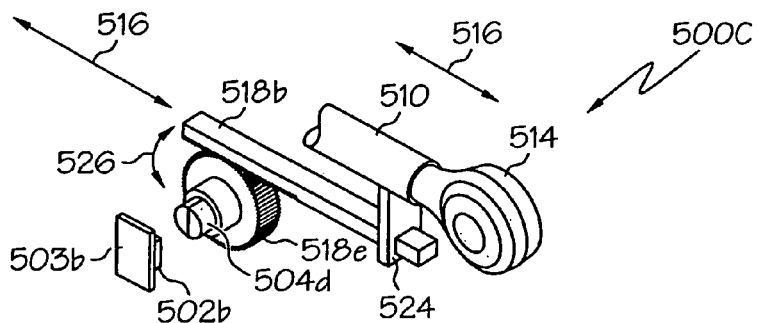

FIG. 5 includes FIGS. 5A–5C, which respectively depict various configurations of magnetic sensors 502a–502b and magnets 504a–504b for position sensing according to embodiments 500A–500C of the present invention. FIG. 5A depicts an embodiment 500A that includes a representative actuator that includes a motor 501 and an actuator output rod 510 coupled to the motor 501 via drive screw 512 and gears 506 and 508. A rod-end bearing assembly 514 is connected to the output rod 510 for connection to a moveable element. The output rod 510 has a direction of motion indicated by arrow 516. Motion of the output rod 510 is produced by a suitable prime mover, e.g., motor 501, and the mechanical connection of drive screw 512 powered by gears 506 and 508. FIGS. 5B–5C include broken views of the FIG. 5A, with different magnet and sensor configurations coupled to secondary drive elements of the actuator. As depicted in FIG. 5A, a multi-element magnetic sensor 502a can be configured and arranged to detect the changing magnetic field of corresponding magnet 504a caused by the motion of the primary drive element 506 to which the magnet 504a is coupled. Multi-element magnetic sensor 502a is located within magnetic proximity of a magnet 504a, which in the embodiment shown in FIG. 5A, is affixed on the end of a stub shaft attached to the motor shaft of the actuator motor 501.

Magnet and sensor assemblies may be configured and arranged to detect the motion of not only primary drive elements, which transfer power to an output element, such as gear 506 but also secondary drive elements that do not transfer power to any output elements. For example, FIGS. 5A–5C depict different magnet and sensor assemblies for detecting the motion of different secondary drive elements that are mechanically connected to rod end 510. FIG. 5A depicts one configuration of a magnet 504b affixed to a secondary drive element including a gear 518a. A multi-element magnetic sensor 502b is mounted on a base, e.g., a PCB 503b, in proximity to the magnet 504b. Magnet 504b is mechanically coupled or affixed to gear 518a that meshes with a subsidiary gear 518b. Both gears, 518a and 518b, are mounted on bearings (not shown) that allow for rotation and prevent translation of the gears. The subsidiary gear 518b is rotated by the axial motion of drive screw 520 that is driven by screw shank 522. The drive screw shank 522 is connected to the actuator output element 510 by a bracket 524. As the actuator output element 510 moves along a direction of motion, shown by arrow 516, drive screw shank 522 is moved in the same direction. This translates drive screw 520 that causes the rotation of gears 518b and 518a. The magnet 504b that is affixed or otherwise coupled to gear 518a then rotates on an axis substantially parallel to actuator output rod 510. Output signals from sensors 502a and 502b can be combined by control means (not shown) to provide a compound-resolution position measurement of a desired moveable element, e.g., output rod 510. By adjusting the radii of the various gears, the mechanical advantage of the drive elements can be changed. This can produce a corresponding adjustment to the output signals produced by the magnetic sensors 502a–502b, with a similar effect on the compound-resolution in position measurement.

FIG. 5B depicts another embodiment 500B of a magnet 504b affixed to a secondary drive element including a crankshaft and crank arm assembly 518c. The magnet 504b is affixed to crank arm 518c near to or on the axis of rotation of the crankshaft and crank arm assembly 518c. The crank arm assembly 518c is connected by a pivotable connection 519 to the shank 522a. The shank 522a is connected by a bracket 524 to the actuator output rod 510. As the actuator output rod 510 moves, indicated by direction of motion 516, the crank arm 518c and the affixed magnet 504b rotate about the axis of rotation, as indicated by arrow 526. In FIG. 5B, the rotation of the magnet 504b is substantially perpendicular to actuator output rod 510. FIG. 5C depicts another embodiment 500C of a magnet 504b affixed to a secondary drive element including a pinion 518e of a rack and pinion assembly. The associated rack 518d is connected by a bracket 524 to the actuator output rod 510. As the actuator output rod 510 moves along a range of movement, indicated by arrow 516', the rack 518d translates, also as indicated by arrow 516'. The magnet 504b consequently rotates along with pinion 518e, as indicated by arrow 526, about an axis substantially perpendicular to the actuator output element 510.

For certain applications, it may be desirable to enclose motors and other moving components of movable mechanical systems, e.g., EMAs. An EMA motor may be sealed to inhibit unwanted leaking, in or out, of fluids, gasses, EMI or magnetic fields. A sealed housing 610 can protect an EMA from a harsh environment. In certain embodiments, an EMA having a motor sealed in a housing 610 can be immersed in a fluid for wet motor operation.

Figure 6:
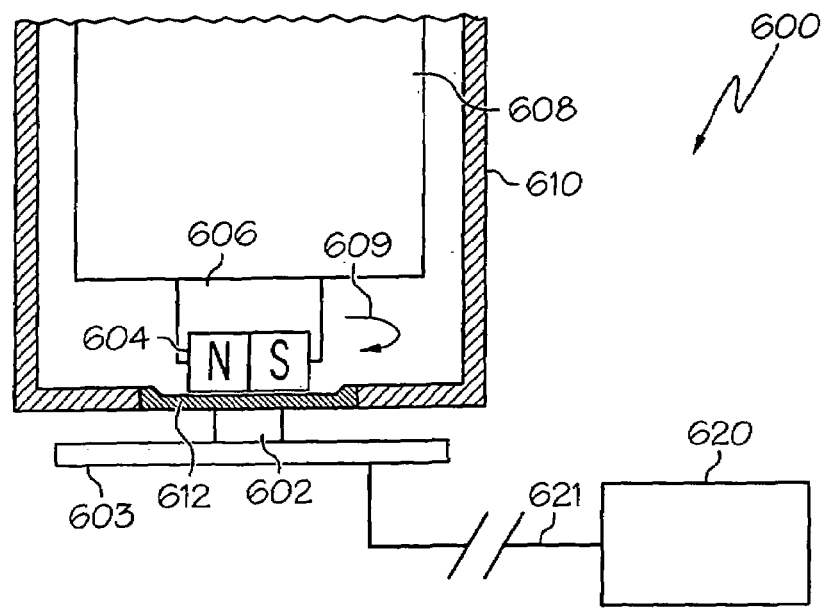
FIG. 6 depicts an embodiment including an actuator motor sealed in a housing.

FIG. 6 depicts an embodiment 600 that includes an EMA motor 608 that is sealed in a housing 610. A magnet 604 is affixed to a motor shaft 606 of the EMA motor 608. A multi-element magnetic sensor 602 is mounted on a base 603, e.g., a PCB, outside of the housing 610 in magnetic proximity to the magnet 604. The housing 610 may include nonmagnetic window 612 positioned between the magnet 604 and the multi-element magnetic sensor 602.

Because the magnetic field from the magnet 604 is unimpeded by nonmagnetic material(s) of the window 612, the multi-element magnetic sensor 602 will operate through the nonmagnetic window 612. Suitable nonmagnetic materials for the window 612, include but are not limited to titanium, certain nonmagnetic ceramic materials, and/or plastic materials. In certain high-speed embodiments, the window 612 may be made of a non-electrically conducting material, e.g., a nonmagnetic ceramic materials or plastic material, to avoid the magnetic field attenuation resulting from the counteracting field produced by eddy currents in an electrically conducting material.

Embodiments of the present invention may provide for compound-resolution, e.g. dual-speed resolution, position measurement of movable elements. For example, dual-speed resolving capability can be provided by using two or more multi-element magnetic sensors to sense the movement of different power train elements that undergo dissimilar movement. For example, two or more multi-element magnetic sensors may be configured to detect the movement, respectively, of gears having different gear diameters. Such gears in a gear train move at different speeds relative to an associated machine component such as actuator output element.

Figure 7:
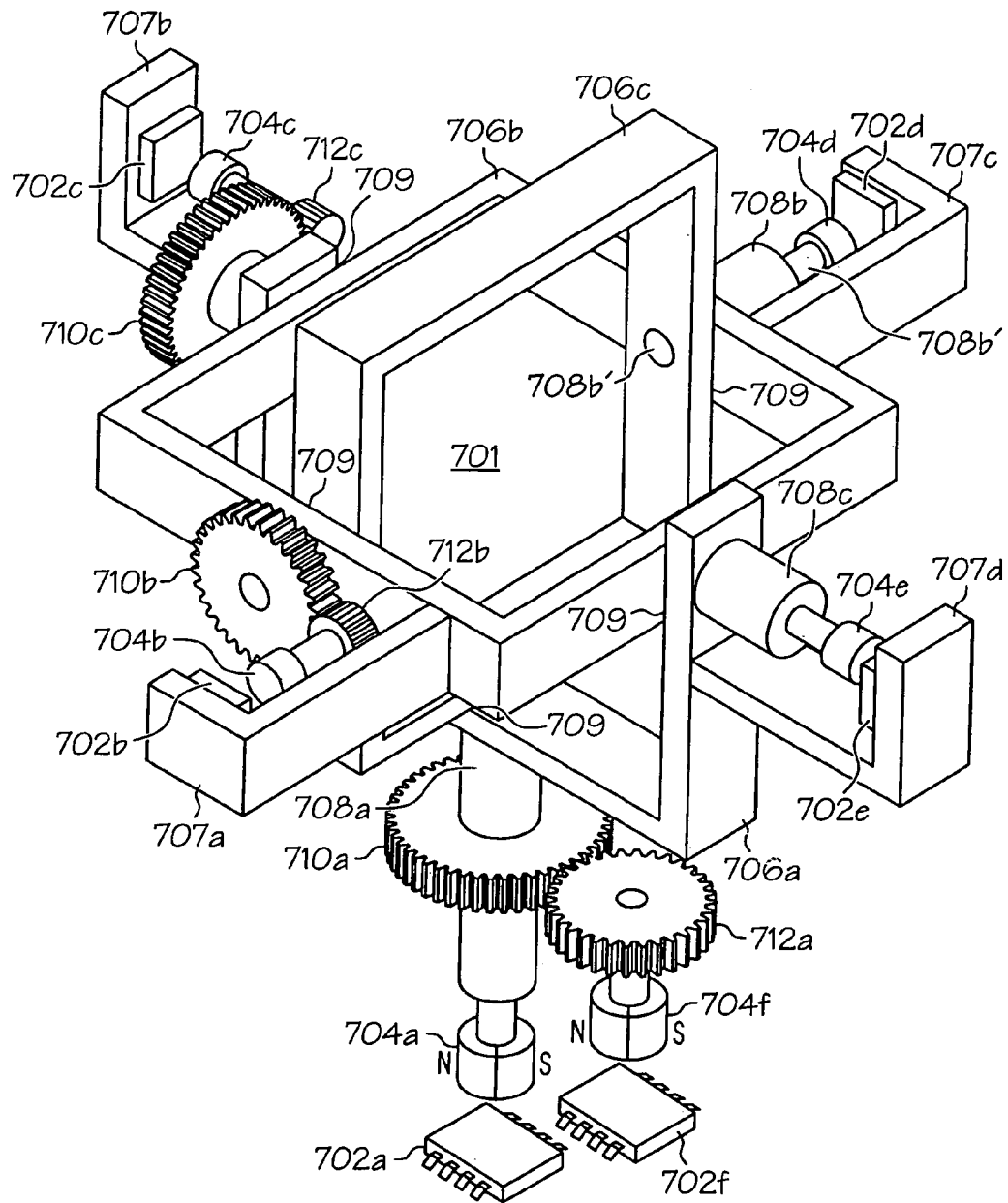
FIG. 7 depicts an embodiment of a gimbal according to the present invention.

FIG. 7 depicts a further embodiment directed to dual resolution position measurement in a gimbal 700. The gimbal 700 includes three rotatable frame elements 706a–706c that are pivotable connected to one another. Magnetic sensors 702a–702f and associated magnets 704a–704f are configured to measure position of the frame elements 706a–706c during operation of the gimbal 700. Actuation means, for example EMAs 708a–708c, are mechanically connected, either directly or indirectly, to a respective one of the three frame elements 706a–706c. By controlling the EMAs 708a–708c, alone or in combination, the frame elements 706a–706c can be rotated about their respective axes. A desired component or device that is held by the frame elements 706a–706c can accordingly be oriented in any desired direction. Signals produced by the multi-element magnetic sensors 702a–702f may be used to sense the motion of the gimbal 700 and to control motor commutation of the EMAs 708a–708c. Control means such as an electronic control unit (not shown) may control the position of the gimbal 700 by regulating or selectively applying power signals to one or more of the EMAs 708a–708c.

Each frame element may be pivotably connected to the others by one or more suitable pivotable connections 709 so that as an EMA motor operates, one of the frame elements moves with respect to the pivotably connected frame element. As configured in FIG. 7, frame element 706a has a single pivotable connection 709 to frame element 706c and two pivotable connections 709 to frame element 706b. Frame element 706b has two pivotable connection 709 to frame element 706c. In certain embodiments, a suitable pivotable connection 709 may include an EMA motor shaft e.g., shaft 708b', that is fixed to one frame element, e.g., frame element 706c, with the housing of the associated motor EMA 708b being fixed to another frame element, e.g., frame element 706b. Suitable bushings and/or bearings may be included in a pivotable connection 709 used in the gimbal 700. It should be understood that although the gimbal 700 is depicted as having three rotatable frame elements 706a–706c, a gimbal according to the present invention may have any desired number of rotatable frame elements, e.g., one, two, or more than three, etc.

Certain of the magnets 704a, 704d, and 704e, are preferably mounted on ends of motor shafts of the EMAs 708a–708c to detect the motion between the associated frame elements and the EMA motor shafts during movement of the gimbal 700. Corresponding magnetic sensors, which may be single or multi-element magnetic sensors, may be affixed to the frame elements 706a–706c. When a magnet is mounted to an EMA motor output shaft, the corresponding magnetic sensor directly detects, e.g., with a 1:1 ratio, the motion of the EMA output shaft magnet.

Each rotatable frame element 706a–706b of the gimbal 700 may have more than one magnetic sensor and magnet for position sensing with a combined, e.g., dual-speed, resolution. For example, in certain embodiments, one or more sensors, e.g., 702b, 702c, and 702f, detect movement of corresponding magnets, 702b, 702c, and 702f, that are attached to power train elements, 712a–712c, that move at different speeds than the output shafts of respective EMAs 708a–708c. Such configurations can provide compound-resolution, e.g., dual-resolution, for the position sensing of the various frame elements of the gimbal 700. By suitable design of the geometry of the mechanical connection between higher-speed and lower-speed sensors, a desired level of resolution of position measurement can be provided in conjunction with absolute position measurement. To monitor position beyond one turn of a magnet, e.g., 704f, external circuitry may be used to count the number of index pulses that indicate the number of turns of the magnet.

As previously described, certain embodiments of the invention may provide high-resolution magnetic sensing and absolute position magnetic sensing in combination, e.g., over a broad range of motion. For example, it may be desirable to measure the absolute position over the full range of the actuator at the output element, and at the same time another magnetic sensor and magnet monitors the motion of another machine element, e.g., the motor shaft, to provide much higher resolution. Such functionality may be desirable to ascertain both a high resolution and absolute position and full range of motion of a movable element, e.g., a mechanical component. In certain embodiments, one or more magnetic sensors, e.g., a Hall effect or magneto-resistive device, may be utilized for high-resolution position sensing. Suitable sensors for high-resolution position measurement may be configured to produce either digital or analog signals.

Figure 8:
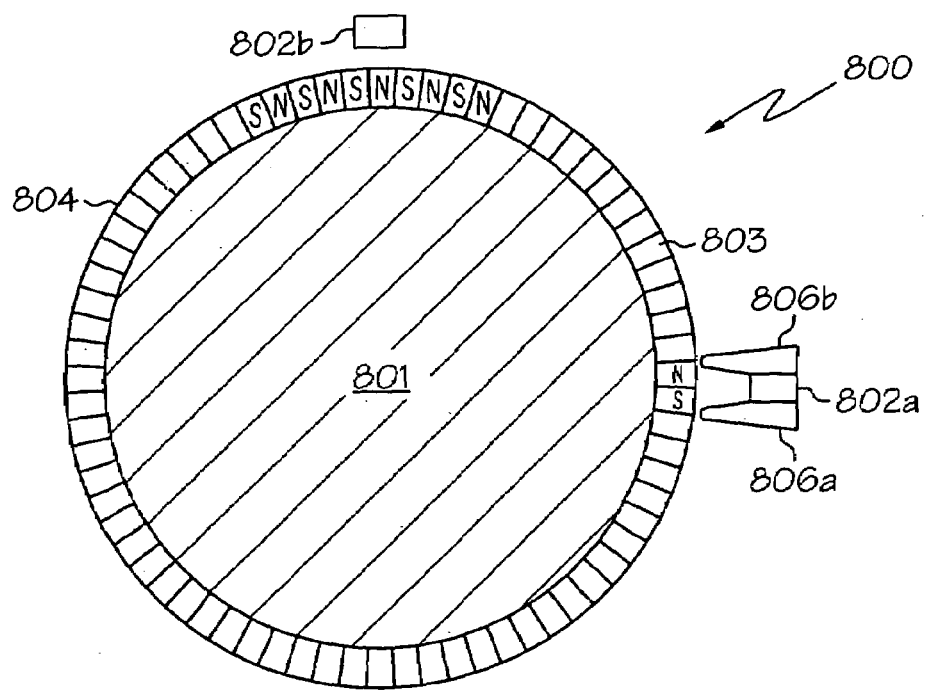
FIG. 8 depicts high-resolution position sensors according to an embodiment of the present invention.

FIG. 8 depicts a suitable magnet and sensor configuration according to a further embodiment 800 of the present invention that includes two high-resolution magnetic position sensors 802a–802b. Such high-resolution position sensors may be suitable for use with an absolute position sensor. Each magnetic sensor 802a–802b is in close proximity to a ring configuration 804 that includes a plurality of magnets 803 disposed about the perimeter of ring 804. The ring 804 is affixed or connected to a rotatable element, such as an actuator motor shaft or the like. Representative north (N) and south (S) poles of the magnets 803 are indicated. The magnets 803 may be individual magnets arranged on a shaft or North and South poles applied in a solid ring of magnetic material. The magnetic poles can be either tightly spaced, which may be desirable for a digital type sensor, or the poles may be widely spaced and sensed in an analog fashion. In certain embodiments, a pair of magnetic yokes 806a–806b may be used to direct magnetic flux to a sensor 802a, as indicated.

Figure 9A:
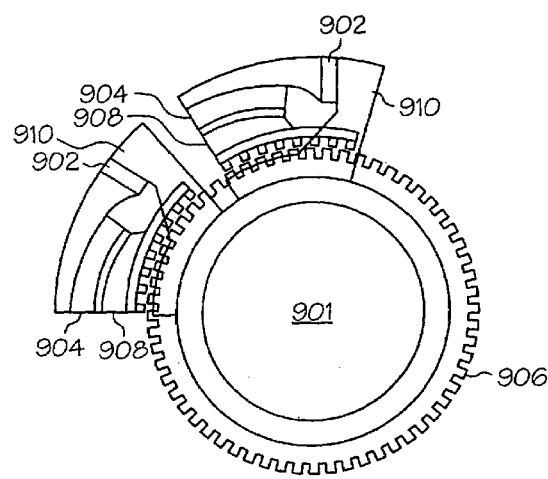
FIG. 9 includes FIGS. 9A–9B, which depict top and side views, respectively, of an embodiment including a high-resolution position sensor utilizing a magnetic flux guide.
Figure 9B:
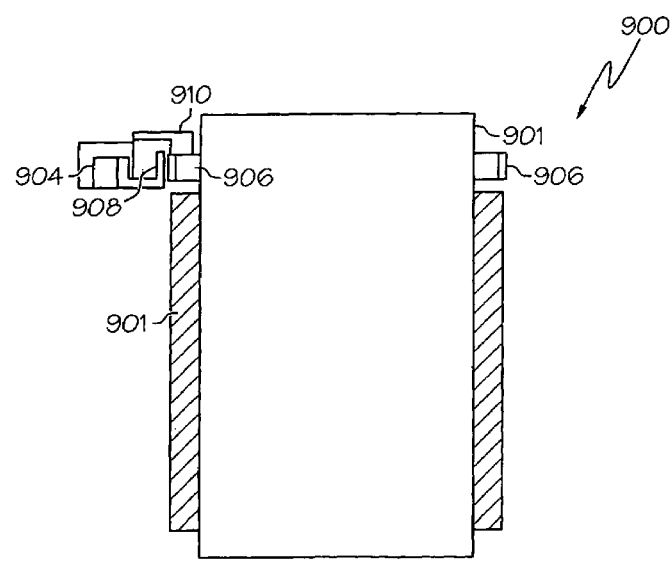

FIG. 9 includes FIGS. 9A–9B, which depict top and side views, respectively, a high-resolution position sensor utilizing a magnetic flux guide, according to a further embodiment 900 of the present invention. Such high-resolution sensors may desirable to measure position of rotatable shafts, for example EMA motor shafts. The flux guide channels magnetic flux from a single dipole magnet 904 to an associated magnetic sensor 902. The flux guide includes a toothed magnetic guide ring 906 configured around and fixed to a shaft 901, which may be a motor or drive train shaft or the like. The flux guide also includes a toothed guide yoke 908 configured and adapted to the toothed guide ring 906. A yoke piece 910 may be positioned to extend from the magnetic sensor over the toothed guide ring 906 in certain embodiments. As the shaft 901 is rotated, the displacement of the teeth of the toothed guide ring 906 relative to the teeth of the toothed guide yoke 908 causes flux variations that are detected by the sensor 902. In certain embodiments, a magnet array and toothed flux guide may be laid out linearly to detect flux variations due to linear movement.

Figure 10:
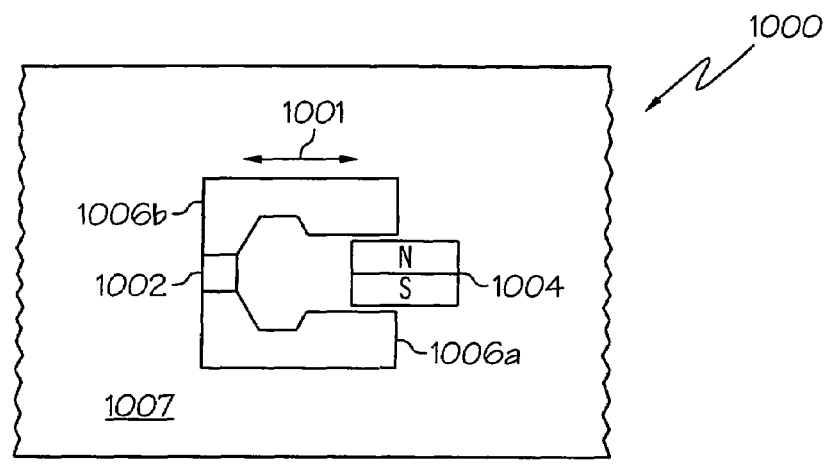
FIG. 10 depicts a cross sectional view of an embodiment including an absolute position sensor.

As described above, certain embodiments of the invention can include a combination of one or more proportional magnetic sensors for absolute position sensing that are used in conjunction with one or more magnetic sensors for high-resolution position sensing. FIG. 10 depicts an absolute position sensor 1002 according to an embodiment 1000 of the present invention. The sensor 1002 is configured and arranged to detect flux density from an associated magnet 1004 to sense the motion of an associated mechanical element, e.g., translatable actuator output shaft 1007. The sensor may be affixed to the machine element in some applications. In other applications, the magnet may be affixed to the machine element 1007. The sensor 1002 may be an analog, or continuous resolution, absolute magnetic sensor, e.g., a Hall effect device or magneto-resistive element. Flux from the associated magnet 1004 is conducted to the sensor 1002 by a pair of magnetic yokes 1006a–1006b. Translation of the sensor 1002 and the high magnetically permeable yokes 1006a–1006b with respect to the magnet 1004 causes the flux density at the sensor 1002 to vary in a detectable fashion.

In certain embodiments, a range of detection of the sensor 1002 would typically cover the full extent of motion of an associated moveable element, e.g., an actuator, as indicated by arrow 1001. The sensor 1002 may be mechanically linked to the output of an actuator in a way that approximately relates the full range of actuator motion to the full range of the sensor. The sensor 1002 is preferably a single Hall effect device or magneto-resistive element, though the sensor 1002 can be a multi-element magnetic sensor.

Variations of flux at the sensor 1002 can be accomplished by moving the magnet 104 relative to the sensor 1002, or vice versa, with out any intervening flux guide or yokes in certain embodiments. Flux variations at the sensor 1002 may be detected by moving a flux guide in a fashion to channel the flux more or less to the sensor 1002. Further, a magnetic element can be moved in a manner to obscure or attenuate the magnetic flux that is delivered to the sensor 1002. This can be done with one pair of magnet and sensor, or multiple magnets (e.g. to increase range or resolution), or multiple sensors or a multiple of both magnets and sensors. Output signals from a sensor 1002 are routed to electronic control means, such as sensing and control electronics, as shown in FIG. 6. The output signals may be used for a desired purpose such as to report or control position of a moveable element.

Figure 11:
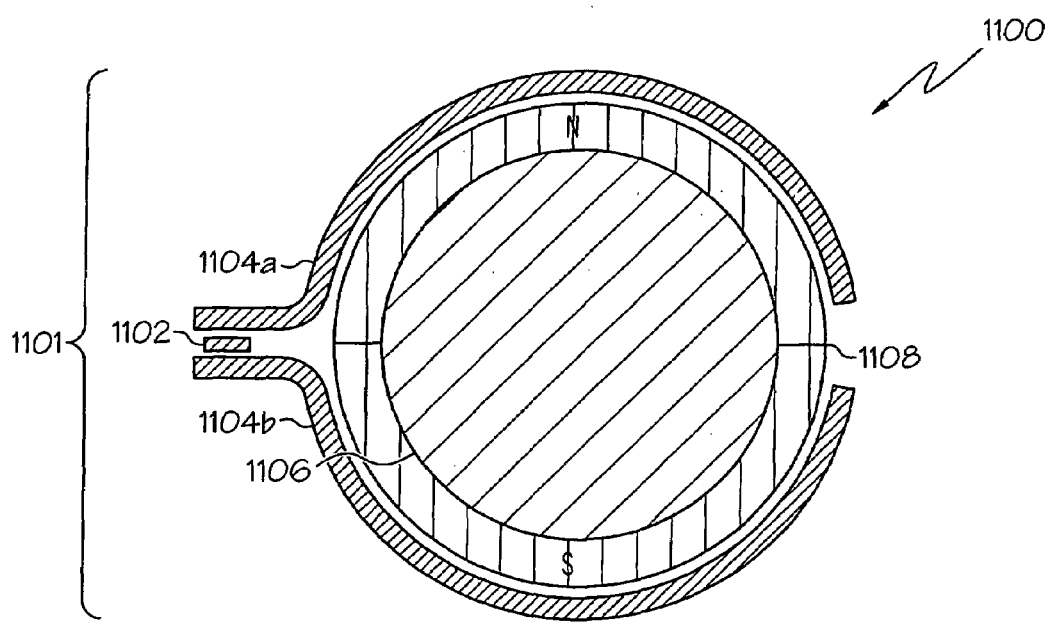
FIG. 11 depicts a cross sectional view of an embodiment including a magnetic quadrature sensor.

In certain embodiments, an absolute position sensor can be configured in a rotary, or circular, fashion similarly to the linear configuration described with respect to FIG. 10. For a circular absolute position sensor, a sensing sequence may be repeated after a full 360 degrees of rotation. FIG. 11 depicts a cross sectional view of a magnetic quadrature sensor 1101 according to a further embodiment 1100 of the present invention. Such quadrature sensors may desirable to measure position of rotatable shafts, for example EMA motor shafts. The quadrature sensor 1101 includes two or more magnetic sensors 1102 such as Hall effect devices or magneto-resistive elements (one sensor is omitted for clarity). A suitable magnetic sensor may be single-element sensor or a multi-elements sensor. Each magnetic sensor 1102 is positioned between a pair of yokes 1104a–1104b that are made of a magnetically conductive material. Each yoke 1104a–1104b is adapted to the circumference of a rotatable shaft 1106, which can be part of the drive train of an actuator or movable machine assembly. A permanent magnet 1108, or other magnetic material, is configured on the circumference of the shaft 1106.

Figure 12A:
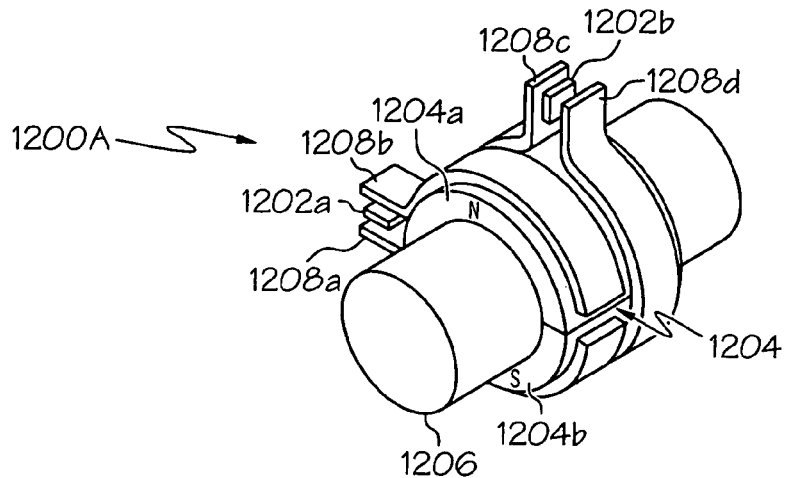
FIG. 12 includes FIGS. 12A–12C, which depict perspective views of different embodiments of a quadrature sensor according to the present invention.

As the shaft 1106 rotates, the sensor 1102 detects the movement of the magnetic field produced by the magnet 1108. By having a second sensor 1102 and pair of yokes positioned 90 degrees apart from the first sensor and pair of yokes along the circumference of the shaft, e.g., as depicted in FIG. 12A, a quadrature signal is obtained as the shaft rotates. The magnetic quadrature sensor 1100 provides the ability for self-calibration and common mode noise reduction. The 1100 sensor may be used as a high-resolution or low-resolution sensor, and may provide absolute or relative position sensing. Electronic control means (not shown), such as an electronic control unit, operable to provide sine wave quadrature decoding may be used to decode the quadrature signals. Embodiments including a magnetic quadrature sensor 1100 may be desirable in applications where access to an end of a rotatable shaft is difficult or impossible. Alternatively, the shaft 1106 may be magnetized diametrically to form a magnetic dipole so that magnet 1108 is not needed.

Figure 12B:
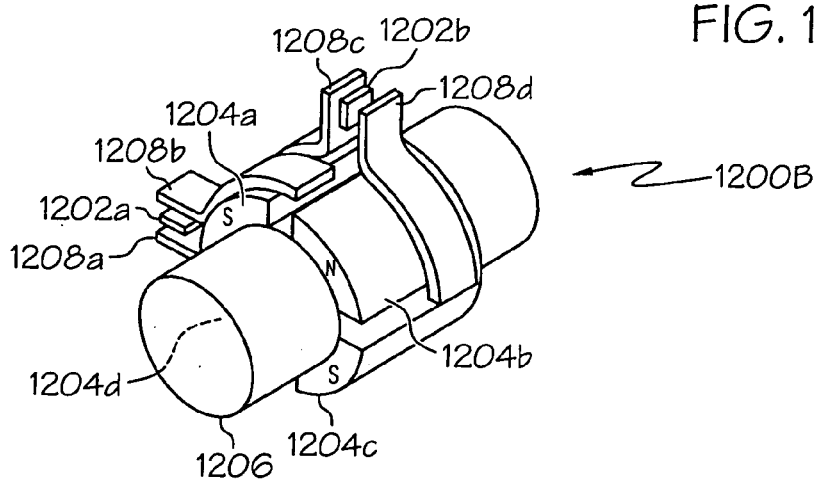
Figure 12C:
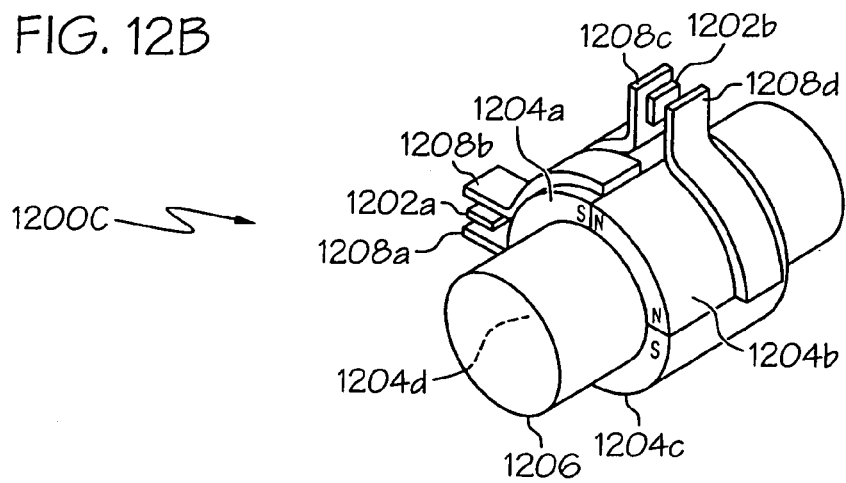

FIG. 12 includes FIGS. 12A–12C, which depict different configurations of a quadrature sensor 1200 used for absolute position sensing according to an embodiment of the present invention. The quadrature sensor includes two magnetic sensors 1202a–1202b, such as Hall effect devices, arranged 90 degrees apart along the circumference of a rotatable shaft 1206. Each sensor is located between ends of a pair of yokes that are adapted to the shaft. FIG. 12A depicts a perspective view of an embodiment including a two-pole magnet. FIG. 12B depicts a perspective view of an embodiment including a four-pole magnet. FIG. 12C depicts a perspective view of an embodiment including an alternate configuration of a four-pole magnet.

Figure 13:
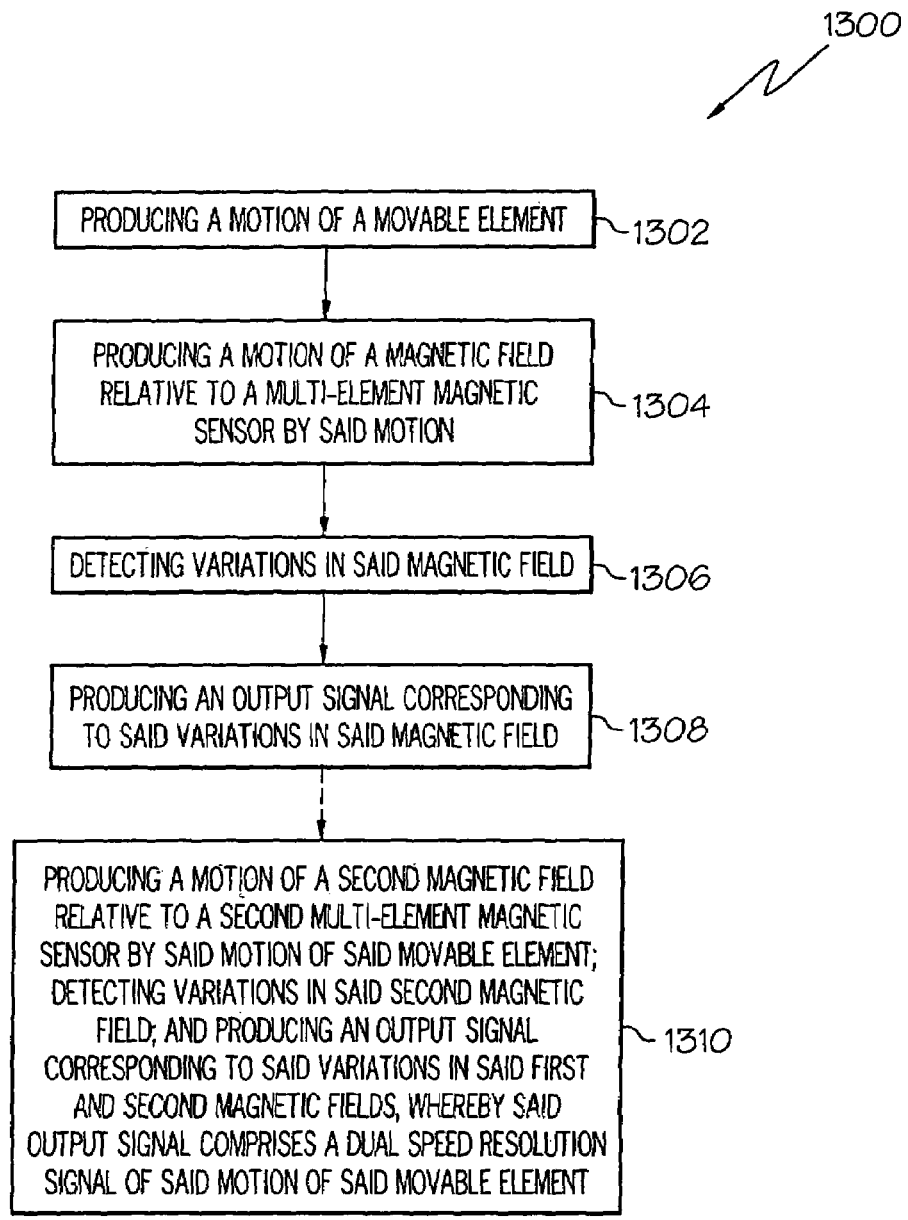
FIG. 13 depicts steps in a method of measuring position according to an embodiment of the present invention.

FIG. 13 depicts steps in a method 1300 of sensing position according to the present invention. Motion of a movable element of a plurality of movable elements is produced, as described at step 1302. The plurality of moveable elements can for example, be part of a drive train such as an actuator drive train. Such motion may be produced by a desired type of prime mover, such as various types of actuators including, but not limited to, EMAs, hydraulic actuators, pneumatic actuators, etc. Motion of a first magnetic field is produced, as described at step 1304, relative to a first magnetic sensor by the motion of the movable element. Movement of the magnet, an interposed magnetically conductive paramagnetic material, and/or the magnetic sensor may cause the motion of the magnetic field. Motion of a second magnetic field is produced, as described at step 1306, relative to a second magnetic sensor by the motion of the movable element. Flux or variations in the magnetic fields are detected, as described at step 1308. An output signal corresponding to the variations in the magnetic fields is produced, as described at step 1310. A position of the moveable element is measured, as described at step 1312, and may have compound resolution, e.g., dual-speed resolution.

The motion of the movable element, as described at step 1302, may include moving an actuator output element. The motion of the magnetic field, as described at step 1304, may be produced by moving a magnet, for example by rotating the magnet. The motion of the magnetic field, as described at step 1304, may be produced by moving a multi-element magnetic sensor, for example by rotating the sensor. The detection of variations in the magnetic field, as described at step 1308, may include using a magnetic quadrature sensor. The output signal produced, as described at step 1310, may correspond to an absolute position and/or relative position of the movable element. The output signal may be used to control a commutation sequence of a brushless DC motor mechanically connected to the movable element.

Accordingly, embodiments of the present invention may offer various advantages over the prior art. Multi-element magnetic sensors according to the present invention can provide indication of both incremental position change and absolute position. Redundancy of position sensor functionality may be provided by use of two or more multi-element magnetic sensors. Redundancy may be desirable certain applications where high-reliability is required. Embodiments may be used to sense position in an actuation device or movable machine assembly to provide a measurement from which to control the device, e.g., a servoactuator, and/or to report the position to local or higher-level electronics, e.g., an alarm system or control computer. Embodiments may be used to provide low cost, durability, low weight, small volume and/or remote sensing capabilities for servoactuators. Embodiments may include actuators with simple position control, e.g., end of stroke electronic stops.

Certain embodiments may be applied to aerodynamic control surface actuators, aircraft utility actuators, single axis and multi axis gimbals and EMAs. The actuators can be hydraulic, pneumatic or electric in nature. The prime movers of such actuators may be of any suitable type, e.g., motors, pistons, solenoids or voice coils, and the like. Multi-element position sensors according to certain embodiments as installed onto single and multi-axis gimbals in preferred embodiments to reduce cost and weight while maintaining or increasing position accuracy over such devices as rotary variable differential transformers (RVDTs), potentiometers, and resolvers.

Moreover, embodiments of the present invention may be advantageously used as alternatives to synchros, resolvers, RVDTs, linear variable differential transformers (LVDTs), and potentiometers. These sensors provide the same at lower cost and in a smaller and more flexible footprint. For applications using brushless DC motors these sensors and associated control electronics can be used to provide the requisite commutation sequencing. The high-resolution position sensing provided by these sensors allow for sine drive type commutation that can reduce torque ripple and improve the effective use of motor torque capability. Embodiments can provide for remote location of a position sensor. Remote position sensing can provide advantages including (i) the ability to thermally isolate the sensor, (ii) the ability to produce an output signal that is based on a particular drive element, and/or (iii) and the ability to locate the sensor at a convenient or accessible location.

While the present invention has been particularly shown and described with references to preferred embodiments thereof, it will be understood by those skilled in the art that various changes in form and details may be made therein without departing from the spirit and scope of the invention as defined by the appended claims.

What is claimed is:

1. A position sensing system for a drive train having a plurality of moveable drive elements, said system comprising:
   a plurality of magnets, wherein each of said plurality of magnets is affixed to a corresponding one of said plurality of moveable drive element of said drive train;
   a plurality of magnetic sensors, wherein each of said plurality of magnetic sensors is configured and operable to detect a change in magnetic flux density produced by motion of a magnetic field produced by a corresponding one of said plurality of magnets and each of said magnetic sensors is operable to produce an output signal corresponding to said change in magnetic flux density due to the motion of each corresponding moveable drive element; and
   control means connected to said plurality of magnetic sensors, said control means being operable to determine a position of one or more of the plurality of moveable drive elements as a function of said plurality of output signals, and wherein each of said plurality of output signals is a component of a combined signal.

2. The system of claim 1, wherein said plurality of magnets comprise multiple-poled magnets.

3. The system of claim 2, wherein said plurality of magnets comprise eight-poled magnets.

4. The system of claim 1, wherein one of said plurality of magnetic sensors comprises a multi-element magnetic sensor.

5. The system of claim 1, wherein said control means is operable to produce a control signal as an output.

6. The system of claim 4, wherein said multi-element magnetic sensor comprises a plurality of magneto-resistive elements.

7. The system of claim 6, wherein said plurality of magneto-resistive elements comprises four magneto-resistive elements configured electrically in a bridge configuration.

8. The system of claim 7, wherein said bridge configuration is a Wheatstone bridge.

9. The system of claim 4, wherein said multi-element magnetic sensor comprises a plurality of Hall effect elements.

10. The system of claim 9, wherein said plurality of Hall effect elements comprise proportional Hall effect elements.

11. The system of claim 9, wherein said plurality of Hall effect elements comprise digital Hall effect elements.

12. The system of claim 10, wherein said plurality of Hall effect elements comprise four proportional Hall effect elements configured and arranged in an IC.

13. The system of claim 1, further comprising a high-resolution magnetic sensor and a plurality of high-resolution magnets having alternating north and south magnetic poles arranged in a first configuration, wherein said plurality of high-resolution magnets are affixed to one of said plurality of moveable drive elements, and wherein said high-resolution magnetic sensor is operable to measure magnetic field variations produced by motion of said plurality of high-resolution magnet during motion of said moveable element.

14. The system of claim 13, further comprising a toothed magnetic flux guide adjacent to said high-resolution magnetic sensor and operable to channel magnetic flux from said plurality of high-resolution magnets to said high-resolution magnetic sensor.

15. The system of claim 13, wherein said high-resolution magnetic sensor comprises a magneto-resistive element.

16. The system of claim 13, wherein said high-resolution magnetic sensor comprises an analog Hall effect element.

17. The system of claim 13, wherein said high-resolution magnetic sensor comprises a digital Hall effect element.

18. The system of claim 13, wherein said first configuration is a ring.

19. The system of claim 13, wherein said first configuration is a linear array.

20. The system of claim 1, further comprising a flux guide affixed to said moveable element and operable to modulate magnetic flux of one of said plurality of magnetic sensors.

21. The system of claim 1, wherein said plurality of drive train elements includes a rotatable shaft, and wherein one of said plurality of magnetic sensors comprises a magnetic quadrature sensor including two pairs of magnetic yokes adapted to the circumference of said shaft, wherein said shaft includes a plurality of magnets, and wherein a respective magnetic sensor of said multi-element magnetic sensor is disposed between and ends of a respective pair of said two pairs of magnetic yokes, wherein said magnetic quadrature sensor is operable to detect motion of said shaft and to produce as an output a quadrature signal corresponding to said motion.

22. The system of claim 21, wherein said control means comprise an electronic control unit operable to receive said quadrature signal from said magnetic quadrature sensor and to provide a sine wave quadrature decoding for said quadrature signal to determine a position of said shaft.

23. The system of claim 21, wherein said magnetic yokes comprise a paramagnetic magnetic material.

24. The system of claim 1, wherein said magnet comprises a magnetic material selected from the group consisting of iron, nickel, cobalt, dysprosium, and gadolinium.

25. The system of claim 1, wherein said control means includes an electronic controller coupled to said plurality of magnetic sensors and operable to receive said output signals therefrom.

26. The system of claim 1, wherein one of said plurality of magnetic sensors comprises a magnetic quadrature sensor and wherein said control means comprise an electronic control unit operable to receive said quadrature signal from said magnetic quadrature sensor and to provide a sine wave quadrature decoding for said quadrature signal to determine a position of at least one of said plurality of moveable drive elements of said drive train.

* * * * *

UNITED STATES PATENT AND TRADEMARK OFFICE
CERTIFICATE OF CORRECTION

PATENT NO.        : 7,116,100 B1                                  Page 1 of 1
APPLICATION NO.   : 11/084969
DATED             : October 3, 2006
INVENTOR(S)       : M. Robert Mock and Grant Sweer It is certified that error appears in the above-identified patent and that said Letters Patent is hereby corrected as shown below:

Title Page, Heading (65), should read: --     Prior Publication Data
                                         US 2006/0208726 A1 Sep. 21, 2006 --

Signed and Sealed this

Twenty-sixth Day of December, 2006

JON W. DUDAS
*Director of the United States Patent and Trademark Office*